US010262441B2

(12) United States Patent
Mendez Mendez et al.

(10) Patent No.: US 10,262,441 B2
(45) Date of Patent: Apr. 16, 2019

(54) USING FEATURES AT MULTIPLE SCALES FOR COLOR TRANSFER IN AUGMENTED REALITY

(71) Applicant: QUALCOMM Incorporated, San Diego, CA (US)

(72) Inventors: Erick Mendez Mendez, Vienna (AT); Daniel Wagner, Vienna (AT); Michael Gervautz, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 14/625,380

(22) Filed: Feb. 18, 2015

(65) Prior Publication Data

US 2016/0239986 A1 Aug. 18, 2016

(51) Int. Cl.
*G06T 11/00* (2006.01)
*G06T 19/00* (2011.01)

(52) U.S. Cl.
CPC .......... *G06T 11/001* (2013.01); *G06T 19/006* (2013.01)

(58) Field of Classification Search
CPC ............................ G06T 11/001; G06T 19/006
See application file for complete search history.

(56) References Cited

U.S. PATENT DOCUMENTS

| | | | |
|---|---|---|---|
| 5,089,976 A * | 2/1992 | Cate | G01J 3/46 348/E9.037 |
| 6,195,456 B1 * | 2/2001 | Balasubramanian | G06T 5/10 358/518 |
| 2002/0057280 A1 * | 5/2002 | Anabuki | G02B 27/017 345/633 |
| 2013/0002698 A1 * | 1/2013 | Geiger | G06T 15/00 345/589 |
| 2013/0155468 A1 * | 6/2013 | Ukishima | H04N 1/603 358/3.23 |
| 2014/0063275 A1 | 3/2014 | Kraehenbuehl et al. | |
| 2014/0147041 A1 | 5/2014 | Brown et al. | |

FOREIGN PATENT DOCUMENTS

WO     2013164043 A1     11/2013

OTHER PUBLICATIONS

Faridul H.S., et al., "A Survey of Color Mapping and its Applications," Eurographics-State of the Art Reports (STAR), Apr. 2014, pp. 43-67.

(Continued)

*Primary Examiner* — Maurice L. McDowell, Jr.
(74) *Attorney, Agent, or Firm* — Austin Rapp & Hardman, P.C.

(57) ABSTRACT

Disclosed is a method and apparatus for using color measurement features at multiple scales for a Color Transfer technique. In one embodiment, the functions implemented include: resizing a ground truth image target frame to a plurality of different scales; selecting one or more color measurement features from the ground truth image target frame at each of the plurality of different scales; making a color measurement for each color measurement feature in the ground truth image target frame; and adjusting colors of a virtual object in an augmented frame based at least in part on the color measurements.

28 Claims, 4 Drawing Sheets

(56) References Cited

OTHER PUBLICATIONS

Maddalena L., et al., "A Self-Organizing Approach to Background Subtraction for Visual Surveillance Applications," IEEE Transactions on Image Processing, Jul. 2008, vol. 17 (7), pp. 1168-1177.
International Search Report and Written Opinion—PCT/US2016/014579—ISA/EPO—dated May 8, 2017.
Oskam T., et al., "Fast and Stable Color Balancing for Images and Augmented Reality", 3D Imaging, Modeling, Processing, Visualization and Transmission (3DIMPVT), 2012 Second International Conference on, IEEE, Oct. 13, 2012 (Oct. 13, 2012), XP032277256, pp. 49-56.
Pouli T., et al., "Progressive Color Transfer for Images of Arbitrary Dynamic Range", Computers and Graphics, Elsevier, GB, vol. 35, No. 1, Nov. 5, 2010 (Nov. 5, 2010), XP028132917, pp. 67-80.
Xuelian Y., et al., "A False Color Image Fusion Method Based on Multi-Resolution Color Transfer in Normalization YCBCR Space", OPTIK, Wissenschaftliche Verlag GMBH, DE, vol. 125, No. 20, Aug. 27, 2014 (Aug. 27, 2014), XP029066445, pp. 6010-6016.

\* cited by examiner

USING FEATURES AT MULTIPLE SCALES FOR COLOR TRANSFER IN AUGMENTED REALITY

FIELD

The subject matter disclosed herein relates to electronic devices and, more particularly, to methods and apparatuses for use with Augmented Reality environments implemented by electronic devices.

BACKGROUND

With the Augmented Reality technology, a video feed, either live or pre-recorded, or a series of related images may be augmented with one or more virtual objects. The video feed, the frames of the video feed, or the related images that are augmented with virtual objects may be hereinafter referred to as image targets. The virtual objects are superposed on the image targets so that the virtual objects appear as if they are part of the real-world scenes in the image targets. The pose of the image targets may be tracked with known methods, and the pose of the virtual objects may be adjusted accordingly to maintain the realism of the virtual objects.

When lighting conditions change in the image target, a known technique named Color Transfer may be used to maintain the realism of the virtual object by adjusting the colors of the virtual object so that the colors of the virtual object reflect the lighting condition change in the image target. An image target frame with a neutral lighting condition may be used as the ground truth, i.e., the baseline, for measuring the change in the lighting condition. Broadly speaking, the Color Transfer technique measures the color differences between the colors of the incoming image target frame and the colors of the ground truth image target frame, and adjusts the colors of the virtual objects accordingly. A Color Transfer function may be derived and utilized in the process, and the Color Transfer function may take into account colors of the ground truth image target frame, colors of the incoming image target frame, and colors of the virtual objects before adjustment, and provide suitable adjusted colors for the virtual objects.

Known Color Transfer technique may result in incorrect, unexpected, or less-than-ideal results under certain circumstances. For example, it may be susceptible to occlusion: the color difference measurements in the Color Transfer process may be incorrect or conflicting when, for example, an occluding object such as a hand not present in the ground truth image target frame appears in the incoming image target frame. The colors of the occluding object may be compared to the colors of the ground truth by the known Color Transfer process to derive color differences when colors of the occluding object and colors of the ground truth are not comparable as they are not associated with the same physical object, resulting in incorrect color difference measurements. Using these incorrect color difference measurements, the known Color Transfer technique may apply a wrong color adjustment to the virtual object. The known Color Transfer technique may also generate less-than-ideal results when there are scale changes in the incoming image target frames (e.g., when the incoming image target frames represent a zoomed in or zoomed out view).

SUMMARY

An embodiment disclosed herein may include a method for using color measurement features at multiple scales for a Color Transfer technique, comprising: resizing a ground truth image target frame to a plurality of different scales; selecting one or more color measurement features from the ground truth image target frame at each of the plurality of different scales; making a color measurement for each color measurement feature in the ground truth image target frame; and adjusting colors of a virtual object in an augmented frame based at least in part on the color measurements.

Another embodiment disclosed herein may include an apparatus for using color measurement features at multiple scales for a Color Transfer technique, comprising: a memory; and a processor configured to: resize a ground truth image target frame to a plurality of different scales, select one or more color measurement features from the ground truth image target frame at each of the plurality of different scales, make a color measurement for each color measurement feature in the ground truth image target frame, and adjust colors of a virtual object in an augmented frame based at least in part on the color measurements.

A further embodiment disclosed herein may include an apparatus for using color measurement features at multiple scales for a Color Transfer technique, comprising: means for resizing a ground truth image target frame to a plurality of different scales; means for selecting one or more color measurement features from the ground truth image target frame at each of the plurality of different scales; means for making a color measurement for each color measurement feature in the ground truth image target frame; and means for adjusting colors of a virtual object in an augmented frame based at least in part on the color measurements.

An additional embodiment disclosed herein may include a non-transitory computer-readable medium including code which, when executed by a processor, causes the processor to perform a method comprising: resizing a ground truth image target frame to a plurality of different scales; selecting one or more color measurement features from the ground truth image target frame at each of the plurality of different scales; making a color measurement for each color measurement feature in the ground truth image target frame; and adjusting colors of a virtual object in an augmented frame based at least in part on the color measurements.

DETAILED DESCRIPTION

Figure 1:
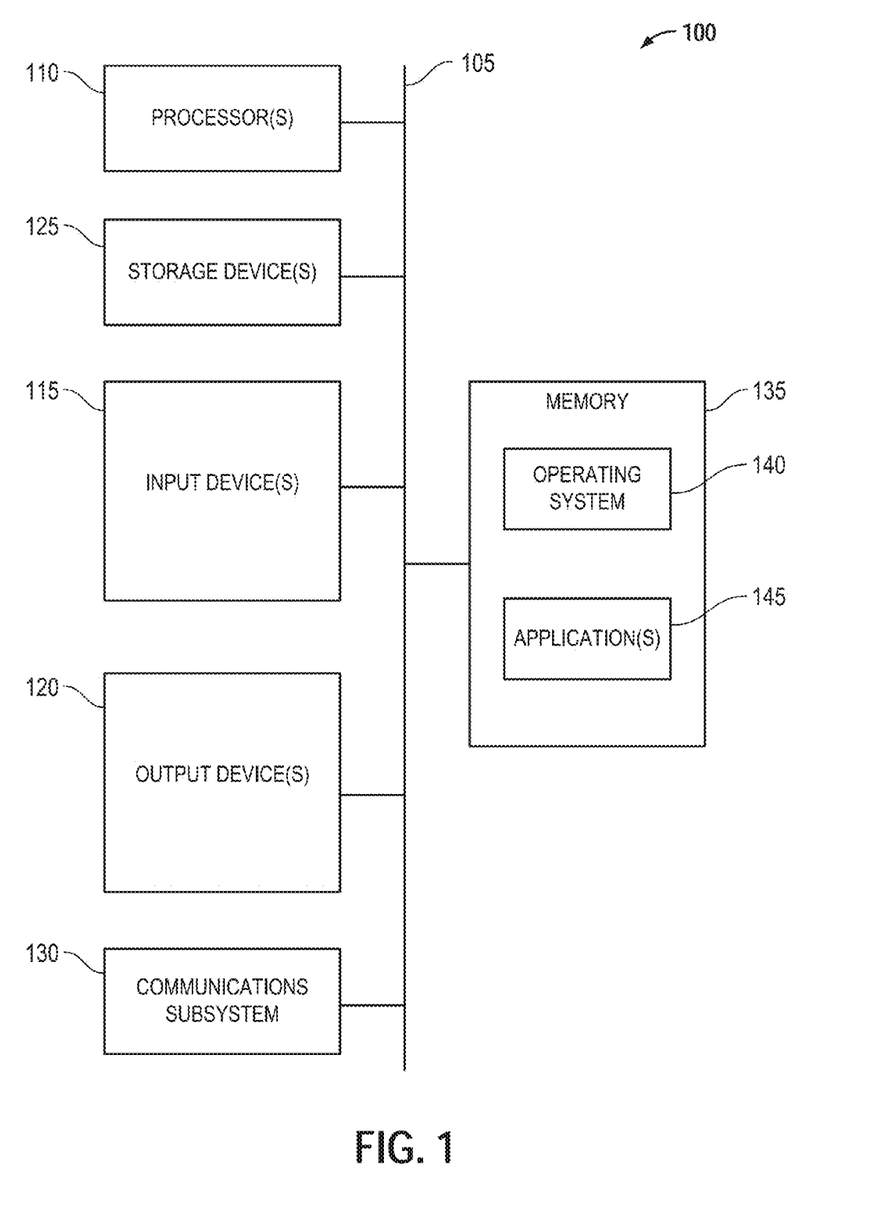
FIG. 1 illustrates an embodiment of a device wherein embodiments of the invention may be practiced.

An example device 100 wherein embodiments of the invention may be practiced is illustrated in FIG. 1. The device as used herein (e.g., device 100) may be a: mobile device, wireless device, cell phone, personal digital assistant, mobile computer, wearable device (e.g., watch, head mounted display, virtual reality glasses, etc.), tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine.

The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which include without limitation a mouse, a keyboard, keypad, touch-screen, camera, microphone and/or the like; and one or more output devices 120, which include without limitation a display device, a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other devices, and/or any other devices described herein. In one embodiment, the device 100 may further comprise a memory 135, which can include a RAM or ROM device, as described above. It should be appreciated that device 100 may be a mobile device or a non-mobile device, and may have wireless and/or wired connections.

The device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by device 100 (and/or a processor 110 within device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a device, such as the device 100. In other embodiments, the storage medium might be separate from a device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

Application programs 145 may include one or more Augmented Reality applications including the Color Transfer functionality. It should be appreciated that the functionality of the Augmented Reality applications may be alternatively implemented in hardware or different levels of software, such as an operating system (OS), a firmware, a computer vision module, etc.

Embodiments of the invention utilize color measurement features, which may comprise a plurality of pixels, extracted from image target frames rescaled at multiple different scales to measure color differences between colors of the ground truth image target frame and colors of the incoming image target frame. A color measurement feature may provide color value measurements of the pixels included in the feature. An illumination invariant correlation method may be used to reduce or prevent errors in the color difference measurements caused by occlusion by excluding colors of the occluding object from being compared to the colors of the ground truth. To use the illumination invariant correlation method, both the ground truth image target frame and the incoming image target frame may be converted into an illumination invariant color space. An image in the illumination invariant color space is a grayscale version of the original image that is approximately independent of the illumination conditions associated with the original image. In other words, the illumination invariant version of two images of the same scene under different lighting conditions would be approximately identical. Therefore, the illumination invariant version of the ground truth image target frame and the illumination invariant version of the incoming image target frame may be correlated and compared to locate the occluding object so that colors of the occluding object may be excluded from the Color Transfer process. The illumination invariant correlation method is also useful against other artifacts similar to occlusion, such as specular highlights.

Figure 2:
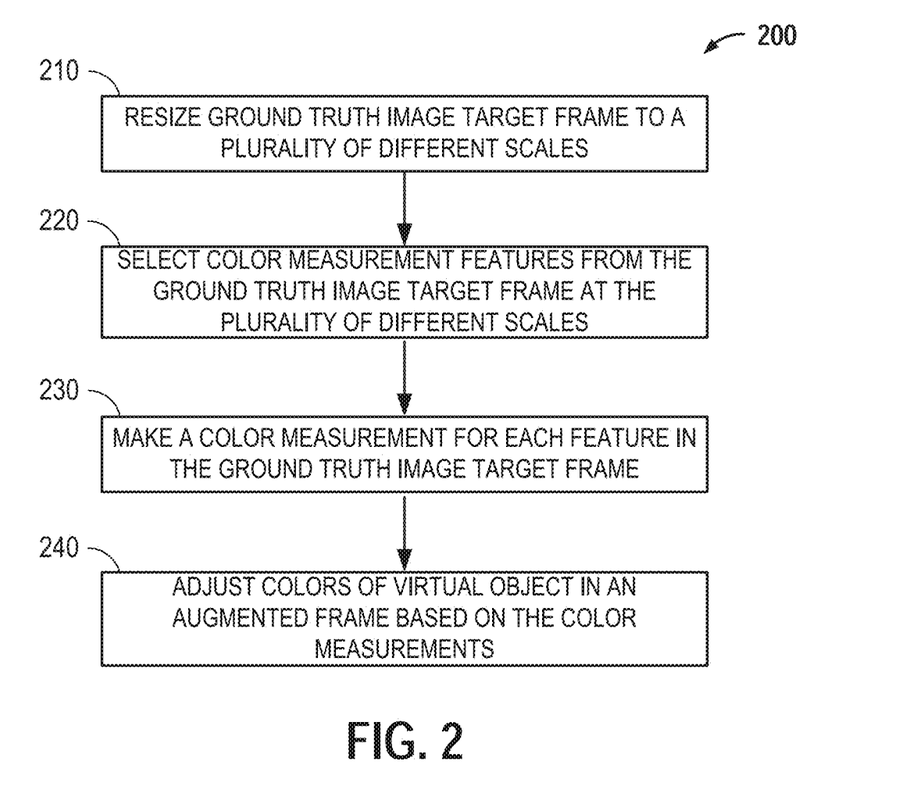
FIG. 2 is a flowchart illustrating an exemplary method for using color measurement features at multiple scales for the Color Transfer technique.

Referring to FIG. 2, a flowchart illustrating an exemplary method 200 for using color measurement features at multiple scales for the Color Transfer technique is shown. A color measurement feature is a chromatic feature that gives actual color values of a sample. Using color measurement features at multiple scales increases robustness against scale changes in the incoming image target frames. At block 210, a ground truth image target frame (e.g., an image target frame with a neutral lighting condition to serve as a baseline) may be resized to a plurality of different scales. Next, at block 220, one or more color measurement features may be selected from the ground truth image target frame at each of the plurality of different scales. The color measurement features may be selected from the features used for pose estimation, or may be defined independently from the features used for pose estimation (a feature is a desirable portion of an image that may comprise a plurality of pixels useful for a particular purpose). Each method has its advantages and disadvantages. For example, re-using the pose estimation features may reduce the computational resources required because results relating to scaling and occlusion detection, which are generated by a conventional pose estimation process, may be reused. However, since pose estimation features are not chosen for color measurement purposes, they may not cover a sufficiently large color span vis-à-vis the colors in the image target frame, and therefore less-than-ideal results may occur. On the other hand, using color estimation features that are separate from pose estimation features may allow for a better coverage of the colors, and may result in better overall color difference measurements. Of course, using separate color estimate features requires more computational resources. Next, at block 230, a color measurement may be made for each color measurement feature selected at block 220 to obtain color values of the color measurement feature. The color values of the color measurement features may then be used to obtain color differences between the ground truth and an incoming image target. Thereafter, at block 240, colors of a virtual object in an augmented frame (i.e., an image target frame superposed by the virtual object) may be adjusted by applying the Color Transfer technique to the virtual object based at least in part on the color measurements of the color measurement features made at block 230. In one embodiment, adjusting the colors of a virtual object may comprise adding the color differences to the neutral colors of the virtual object.

Figure 3A:
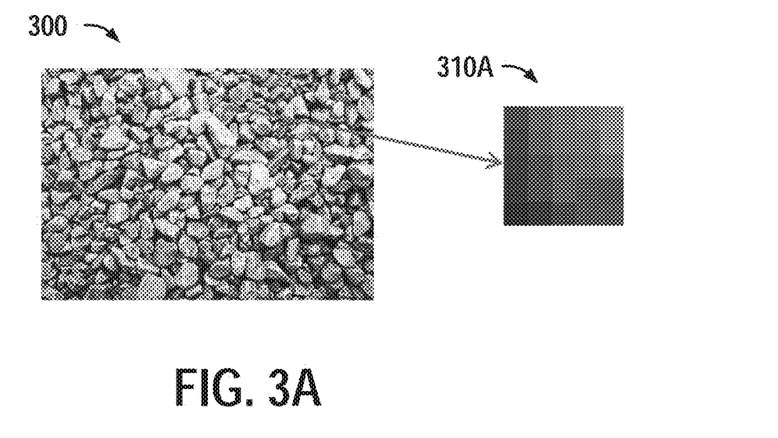
FIGS. 3A-3C illustrate exemplary color measurement features extracted from a ground truth image target frame at three different scales.
Figure 3B:
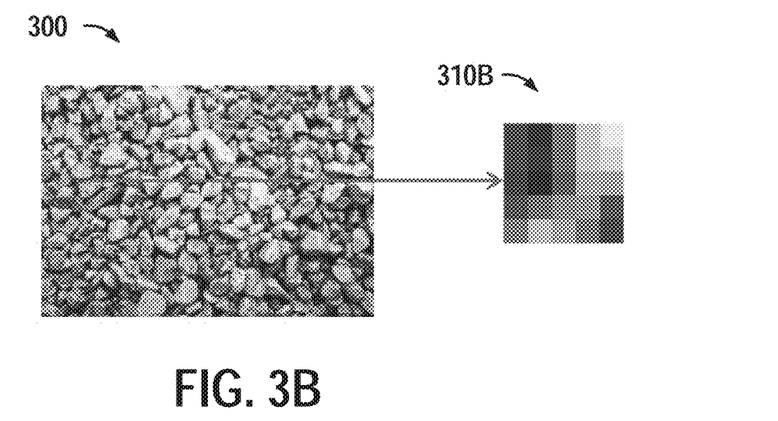
Figure 3C:
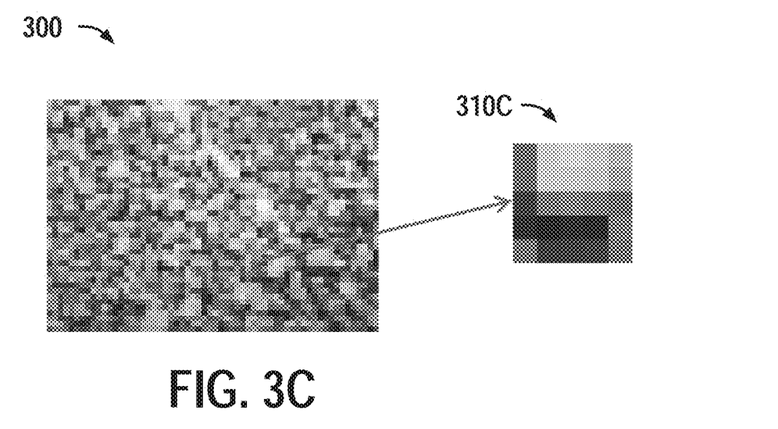

Referring to FIGS. 3A-3C, exemplary color measurement features 310A, 310B, and 310C extracted from a ground truth image target frame 300 at three different scales are shown. It should be noted that the ground truth image target frame 300 at three different scales is normalized to the same size in FIGS. 3A-3C. As shown in FIGS. 3A-3C, color measurement features 310A, 310B, and 310C may be selected from different locations in the ground truth image target frame 300. It should be appreciated that in some embodiments, color measurement features may be selected at the same locations in the ground truth image target frame at different scales.

Figure 4:
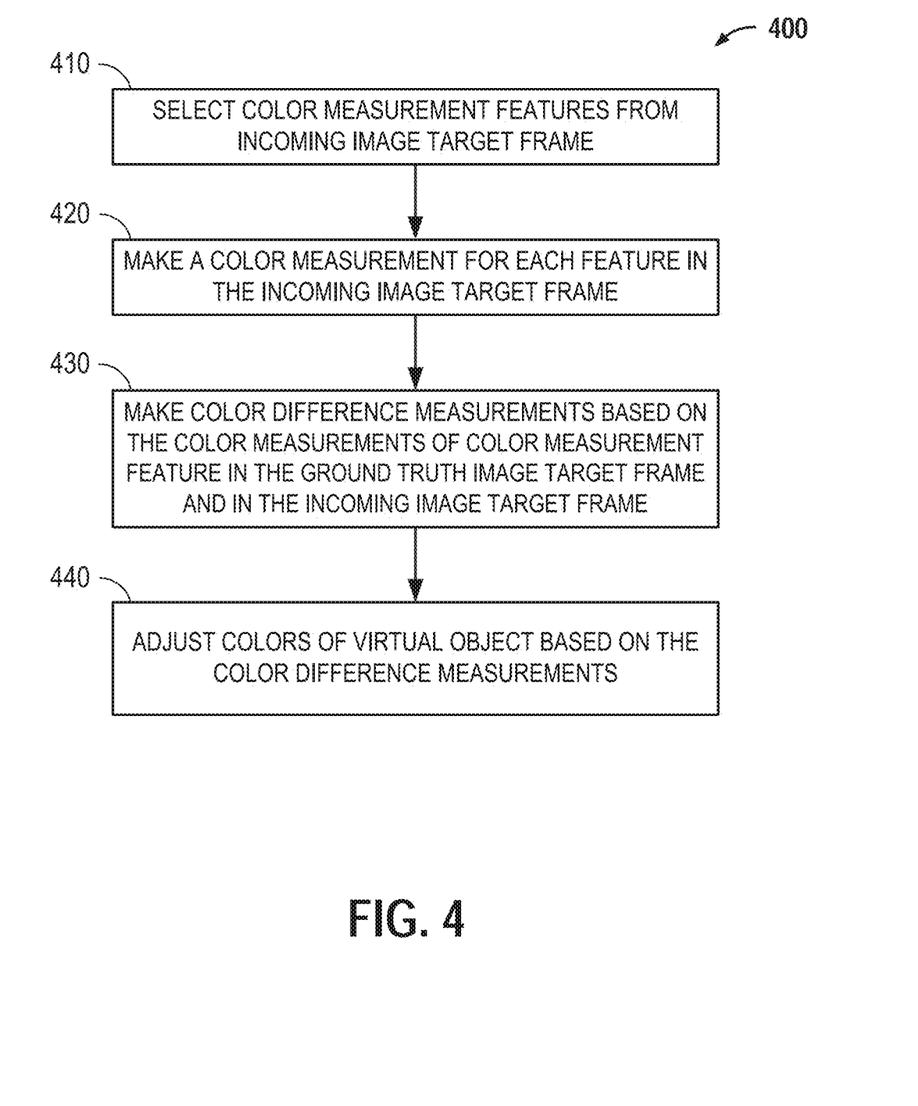
FIG. 4 is a flowchart illustrating an exemplary method for applying the Color Transfer technique to a virtual object.

Referring to FIG. 4, a flowchart illustrating an exemplary method 400 for applying the Color Transfer technique to a virtual object is shown. The method 400 may be performed at block 240 of method 200 in FIG. 2. At block 410, color measurement features may be selected in an incoming image target frame. Color measurement features in the incoming image target frame may be selected so that their locations in the real-world scene correspond to the locations of the color measurement features selected in the ground truth image target frame. Next, at block 420, a color measurement may be made for each color measurement feature selected in the incoming image target frame at block 410. Next, at block 430, one or more color difference measurements may be made based on the color measurements of the color measurement features selected from the ground truth image target frame and the color measurements of the color measurement features selected from the incoming image target frame to measure color differences between the colors of the ground truth image target frame and the colors of the incoming image target frame. An illumination invariant correlation method may be utilized to improve the accuracy of the process in the event of occlusion or other similar situations, such as specular highlights, etc. In some embodiments, color measurement features from the ground truth image target frame at a plurality of different scales generated at block 210 may be utilized. In some other embodiments, color measurement features from the ground truth image target frame at only the scale that most closely matches the scale of the incoming image target frame may be utilized. Using color measurement features from the ground truth image target frame at a scale that matches the scale of the incoming image target frame may improve the accuracy of color difference measurement in situations where the scale of the image target changes. Thereafter, at block 440, colors of the virtual object are adjusted based at least in part on the color differences between the colors of the ground truth image target frame and the colors of the incoming image target frame. A Color Transfer function in the form of F (R, S, c)→t may be derived and utilized for applying the Color Transfer technique to the virtual object, where R is the color measurements of the color measurement features selected in the ground truth image target frame, where S is the color measurements of the color measurement features selected in the incoming image target frame, where c is one or more colors of the virtual object before color adjustment, and where t is one or more colors of the virtual object after color adjustment. The Color Transfer function may be based on, for example, the average color difference between colors of the ground truth image target frame and colors of the incoming image target frame. It should be noted that the invention is not limited by the exact Color Transfer function utilized.

Therefore, by using features at multiple scales for the Color Transfer technique, as described in detail above, certain less-than-ideal results may be prevented. For example, the illumination invariant correlation method may be used to prevent occlusion from disrupting the process of color difference measurement. As a result, the overall performance of the Color Transfer technique in terms of accuracy may be improved.

Various implementations of an Augmented Reality application or system including the Color Transfer functionality have been previously described in detail. It should be appreciated that the Augmented Reality application or system, as previously described, may be implemented as software, firmware, hardware, combinations thereof, etc. In one embodiment, the previous described functions may be implemented by one or more processors (e.g., processor 110) of a device 100 to achieve the previously desired functions (e.g., the method operations of FIGS. 2 and 4).

The teachings herein may be incorporated into (e.g., implemented within or performed by) a variety of apparatuses (e.g., devices). For example, one or more aspects taught herein may be incorporated into a general device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, a wearable device (e.g., watch, head mounted display, virtual reality glasses, etc.), an electronic device within an automobile, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A method for using color measurement features at multiple scales for a Color Transfer technique, comprising:
   resizing a ground truth image target frame to a plurality of different scales;
   selecting one or more color measurement features from the ground truth image target frame at each of the plurality of different scales;

making a color measurement for each color measurement feature in the ground truth image target frame; and adjusting colors of a virtual object in an augmented reality augmented frame based at least in part on the color measurements and one or more color difference measurements between the ground truth image target frame and an incoming image target frame.

2. The method of claim 1, wherein the adjusting of the color of the virtual object based at least in part on the color measurements further comprises:

selecting one or more color measurement features from the incoming image target frame;

making a color measurement for each color measurement feature in the incoming image target frame;

making one or more color difference measurements based on the color measurements of color measurement feature in the ground truth image target frame and the color measurements of color measurement feature in the incoming image target frame; and adjusting one or more colors of the virtual object based at least in part on the color difference measurements.

3. The method of claim 2, wherein the color measurement features are selected from pose estimation features for the incoming image frame.

4. The method of claim 2, wherein the color measurement features are defined independently from pose estimation features for the incoming image frame.

5. The method of claim 2, wherein color measurement features at a plurality of different scales are used in the making of color difference measurements.

6. The method of claim 2, wherein only color measurement features at the scale that most closely matches a scale of the incoming image target frame are used in the making of color difference measurements.

7. The method of claim 2, wherein an illumination invariant correlation method is used in the making of color difference measurements.

8. An apparatus for using color measurement features at multiple scales for a Color Transfer technique, comprising:
a memory; and
a processor configured to:
resize a ground truth image target frame to a plurality of different scales,
select one or more color measurement features from the ground truth image target frame at each of the plurality of different scales,
make a color measurement for each color measurement feature in the ground truth image target frame, and
adjust colors of a virtual object in an augmented reality augmented frame based at least in part on the color measurements and one or more color difference measurements between the ground truth image target frame and an incoming image target frame.

9. The apparatus of claim 8, wherein the processor is further configured to:
select one or more color measurement features from the incoming image target frame;
make a color measurement for each color measurement feature in the incoming image target frame;
make one or more color difference measurements based on the color measurements of color measurement feature in the ground truth image target frame and the color measurements of color measurement feature in the incoming image target frame; and
adjust colors of the virtual object based at least in part on the color difference measurements.

10. The apparatus of claim 9, wherein the color measurement features are selected from pose estimation features for the incoming image target frame.

11. The apparatus of claim 9, wherein the color measurement features are defined independently separate from pose estimation features for the incoming image target frame.

12. The apparatus of claim 9, wherein color measurement features at a plurality of different scales are used in the making of color difference measurements.

13. The apparatus of claim 9, wherein only color measurement features at the scale that most closely matches a scale of the incoming image target frame are used in the making of color difference measurements.

14. The apparatus of claim 9, wherein an illumination invariant correlation method is used in the making of color difference measurements.

15. An apparatus for using color measurement features at multiple scales for a Color Transfer technique, comprising:
means for resizing a ground truth image target frame to a plurality of different scales;
means for selecting one or more color measurement features from the ground truth image target frame at each of the plurality of different scales;
means for making a color measurement for each color measurement feature in the ground truth image target frame; and
means for adjusting colors of a virtual object in an augmented reality augmented frame based at least in part on the color measurements and one or more color difference measurements between the ground truth image target frame and an incoming image target frame.

16. The apparatus of claim 15, wherein the means for adjusting colors of a virtual object based at least in part on the color measurements further comprises:
means for selecting one or more color measurement features from the incoming image target frame;
means for making a color measurement for each color measurement feature in the incoming image target frame;
means for making one or more color difference measurements based on the color measurements of color measurement feature in the ground truth image target frame and the color measurements of color measurement feature in the incoming image target frame; and
means for adjusting colors of the virtual object based at least in part on the color difference measurements.

17. The apparatus of claim 16, wherein the color measurement features are selected from pose estimation features for the incoming image target frame.

18. The apparatus of claim 16, wherein the color measurement features are defined independently separate from pose estimation features for the incoming image target frame.

19. The apparatus of claim 16, wherein color measurement features at a plurality of different scales are used in the making of color difference measurements.

20. The apparatus of claim 16, wherein only color measurement features at the scale that most closely matches a scale of the incoming image target frame are used in the making of color difference measurements.

21. The apparatus of claim 16, wherein an illumination invariant correlation method is used in the making of color difference measurements.

22. A non-transitory computer-readable medium including code which, when executed by a processor, causes the processor to perform a method comprising:

resizing a ground truth image target frame to a plurality of different scales;
selecting one or more color measurement features from the ground truth image target frame at each of the plurality of different scales;
making a color measurement for each color measurement feature in the ground truth image target frame; and
adjusting colors of a virtual object in an augmented reality augmented frame based at least in part on the color measurements and one or more color difference measurements between the ground truth image target frame and an incoming image target frame.

23. The non-transitory computer-readable medium of claim 22, wherein the code for adjusting colors of a virtual object based at least in part on the color measurements further comprises code for:
selecting one or more color measurement features from the incoming image target frame;
making a color measurement for each color measurement feature in the incoming image target frame; making one or more color difference measurements based on the color measurements of color measurement feature in the ground truth image target frame and the color measurements of color measurement feature in the incoming image target frame; and
adjusting colors of the virtual object based at least in part on the color difference measurements.

24. The non-transitory computer-readable medium of claim 23, wherein the color measurement features are selected from pose estimation features for the incoming image target frame.

25. The non-transitory computer-readable medium of claim 23, wherein the color measurement features are defined independently from pose estimation features for the incoming image target frame.

26. The non-transitory computer-readable medium of claim 23, wherein color measurement features at a plurality of different scales are used in the making of color difference measurements.

27. The non-transitory computer-readable medium of claim 23, wherein only color measurement features at the scale that most closely matches a scale of the incoming image target frame are used in the making of color difference measurements.

28. The non-transitory computer-readable medium of claim 23, wherein an illumination invariant correlation method is used in the making of color difference measurements.

* * * * *